United States Patent [19]

Henry

[11] Patent Number: 5,590,396
[45] Date of Patent: Dec. 31, 1996

[54] METHOD AND APPARATUS FOR A DEEP-SLEEP MODE IN A DIGITAL CELLULAR COMMUNICATION SYSTEM

[75] Inventor: Raymond C. Henry, Durham, N.C.

[73] Assignee: Ericsson Inc., Research Triangle Park, N.C.

[21] Appl. No.: 231,000

[22] Filed: Apr. 20, 1994

[51] Int. Cl.$^6$ .................................................. H04Q 7/22
[52] U.S. Cl. ........................... 455/33.1; 455/70; 455/343; 455/38.3
[58] Field of Search .................... 455/33.1, 38.3, 455/54.1, 56.1, 343, 30; 379/59

[56]  References Cited

U.S. PATENT DOCUMENTS

| | | | |
|---|---|---|---|
| 4,449,248 | 5/1984 | Leslie et al. | 455/38.3 |
| 4,479,125 | 10/1984 | Mori | 340/825.44 |
| 4,518,961 | 5/1985 | Davis et al. | 340/825.44 |
| 4,523,332 | 6/1985 | Mori | 455/343 |
| 4,531,237 | 7/1985 | Bar-on et al. | 455/343 |
| 4,577,315 | 3/1986 | Otsuka | 370/95 |
| 4,652,875 | 3/1987 | Waki | 340/825.44 |
| 4,691,382 | 9/1987 | Nakajima | 455/343 |
| 4,736,461 | 4/1988 | Kawasaki et al. | 455/343 |
| 4,745,408 | 5/1988 | Nagata et al. | 340/825.44 |
| 4,785,468 | 11/1988 | Yoshida | 375/75 |
| 4,794,649 | 12/1988 | Fujiwara | 455/343 |
| 4,839,639 | 6/1989 | Sato et al. | 340/825.44 |
| 4,852,148 | 7/1989 | Shibata et al. | 379/59 |
| 4,903,319 | 2/1990 | Kasai et al. | 455/33 |
| 4,903,335 | 2/1990 | Shimizu | 455/343 |
| 4,939,770 | 7/1990 | Makino | 379/61 |
| 4,955,080 | 9/1990 | Wagai et al. | 455/343 |
| 4,961,073 | 10/1990 | Drapac et al. | 340/825.44 |
| 4,964,121 | 10/1990 | Moore | 370/100.1 |
| 4,969,180 | 11/1990 | Watterson et al. | 379/58 |
| 4,977,611 | 12/1990 | Maru | 455/161 |
| 4,987,317 | 1/1991 | Pournain et al. | 307/40 |
| 4,995,099 | 2/1991 | Davis | 455/343 |
| 4,996,526 | 2/1991 | DeLuca | 340/825.44 |
| 5,001,471 | 3/1991 | Snowden et al. | 340/825.21 |
| 5,010,330 | 4/1991 | Snowden et al. | 340/825.21 |
| 5,027,428 | 6/1991 | Ishiguro et al. | 455/67 |
| 5,031,231 | 7/1991 | Miyazaki | 455/54 |
| 5,054,052 | 10/1991 | Nonami | 379/57 |
| 5,058,203 | 10/1991 | Inagami | 455/89 |
| 5,095,308 | 3/1992 | Hewitt | 340/825.44 |
| 5,101,510 | 3/1992 | Duckeck | 455/186 |
| 5,128,938 | 7/1992 | Borras | 370/951 |
| 5,140,698 | 8/1992 | Toko | 455/76 |
| 5,150,361 | 9/1992 | Wieczorek et al. | 370/951 |
| 5,175,874 | 12/1992 | Auchter | 455/89 |
| 5,179,724 | 1/1993 | Lindoff | 455/76 |
| 5,187,471 | 2/1993 | Wagai et al. | 340/825.44 |
| 5,193,312 | 3/1993 | Gudmundsson et al. | 51/120 |
| 5,203,020 | 4/1993 | Sato et al. | 455/68 |
| 5,204,986 | 4/1993 | Ito et al. | 455/343 |
| 5,220,678 | 6/1993 | Feei | 455/69 |
| 5,224,152 | 6/1993 | Harte | 379/59 |
| 5,227,777 | 7/1993 | Sato et al. | 340/825.44 |
| 5,230,077 | 7/1993 | Raith | 455/65 |
| 5,230,084 | 7/1993 | Nguyen | 455/383 |

(List continued on next page.)

FOREIGN PATENT DOCUMENTS

0448789A2 of 0000 European Pat. Off. .
0514360A2 of 0000 European Pat. Off. .
2244409 of 0000 United Kingdom .

Primary Examiner—Edward F. Urban
Attorney, Agent, or Firm—Eric L. Stasik

[57]  ABSTRACT

A method and apparatus is provided for extending the battery life of a cellular radiotelephone. A cellular radiotelephone is conditioned to operate in a pager-only mode wherein the radiotelephone may receive short messages from a base station while conserving battery life by cyclically adopting a deep-sleep state. The base station is notified by the radiotelephone before the radiotelephone enters the deep-sleep state that the radiotelephone is unable to receive messages. After a period of time, the radiotelephone wakes-up, re-establishes contact with the base station and notifies the base station that the radiotelephone is ready to receive messages. After receipt of any messages the radiotelephone repeats the process.

7 Claims, 10 Drawing Sheets

U.S. PATENT DOCUMENTS

| | | | |
|---|---|---|---|
| 5,241,542 | 8/1993 | Natarajan et al. | 370/953 |
| 5,251,325 | 10/1993 | Davis et al. | 455/383 |
| 5,252,963 | 10/1993 | Snowden et al. | 340/825.44 |
| 5,265,270 | 11/1993 | Stengel et al. | 455/343 |
| 5,274,843 | 12/1993 | Murai et al. | 455/383 |
| 5,301,225 | 4/1994 | Suzuki et al. | 455/343 |
| 5,361,397 | 11/1994 | Wright | 455/343 |

FIG. 8

METHOD AND APPARATUS FOR A DEEP-SLEEP MODE IN A DIGITAL CELLULAR COMMUNICATION SYSTEM

FIELD OF THE INVENTION

The present invention relates generally to cellular radio communications and, more specifically, to a method and apparatus for maximizing the battery life of portable cellular radiotelephones used in digital cellular communication systems.

BACKGROUND OF THE INVENTION

Cellular communications systems are well-known. Analog cellular systems such as designated AMPS, ETACS, NET-450, and NET-900 have been deployed successfully throughout the world. More recently, digital cellular systems such as designated IS-54B in North America and the pan-European GSM system have been introduced. These systems, and others, are described, for example, in the book titled Cellular Radio Systems by Balston, et al., published by Artech House, Norwood, Mass., 1993.

The IS-54B specification entitled Cellular System Dual-Mode Mobile Station Base Station Compatibility Standard (available from the Telecommunications Industry Association, 2001 Pennsylvania Avenue, N.W., Washington , D.C., 20006) provides increased system capacity through digital time division multiple access (TDMA) while allowing compatibility with existing analog systems. Mobile stations designed to meet the IS-54B specification are able to function with both the new TDMA systems and the existing AMPS analog systems. Throughout this specification the terms mobile station, cellular telephone, cellular phone, mobile phone, and cellular radiotelephone are used interchangeably to refer to the same device. One drawback to the current specification is that the both the digital and analog systems make use of the existing AMPS analog control channels. Therefore TDMA capable mobile stations are constrained by the old analog protocols and are not able to fully utilize all the features possible with digital communications.

Currently, cellular mobile radiotelephones are limited in stand-by battery life because they must continuously monitor the analog control channel for paging messages indicating an incoming call. Even with high capacity batteries, stand-by times in excess of about 24 hours are rare. This may be contrasted with paging receivers, or "beepers", which have battery lives of about 100–200 hours from a single AA battery achieved by cyclical operation. The need for longer battery life in cellular radiotelephones is therefore self-evident.

A digital control channel (DCC) has recently been proposed to the Telecommunications Industry Association (TIA). The DCC specification is identified as PN 3011-1 and PN 3011-2 and is available from the TIA at the above address. When adopted, the DCC will become part of a new IS-54C specification. The specifications PN 3011-1 and PN 3011-2 are incorporated herein by reference in their entirety.

One feature of the DCC is called short message service (SMS.) With SMS it will be possible to send alphanumeric messages to compatible mobile stations in a manner similar to that presently done with paging receivers. This feature opens the door for many new cellular phone options.

Unlike voice communications in which a caller is waiting for a response from the called-party, alphanumeric messages do not require an immediate response and can be stored and subsequently delivered to the mobile station some period of time after origination. This allows the mobile phone to adopt what will hereinafter be referred to as a "pager-only mode" of operation.

The pager-only mode of the mobile station will allow the user to receive SMS messages but not to receive incoming conversation type calls. The call origination capability remains thereby allowing the user to place calls without exiting the pager-only mode. The pager-only mode offers many advantages to the user not the least of which is the benefit of much longer battery life. The pager-only mode also functions as a do-not-disturb mode for business meetings, and allows the mobile station user to perform "call screening" of incoming calls. Unlike the known broadcast page receiver (i.e., "beeper") , the mobile phone is immediately available to place a call to the message originator.

SUMMARY OF THE INVENTION

In view of the foregoing background, it is therefore an object of the present invention to provide a method for increasing the battery life of a battery-powered cellular radiotelephone.

It is also an object of the present invention to provide a pager-only mode for a cellular radiotelephone thereby allowing the user of a portable cellular radiotelephone to receive short messages broadcast to it from a cellular base station.

These and other objects, advantages, and features of the present invention are provided by a method for saving battery power in a cellular radio communication system having a base station with a base station control signal and a mobile station conditioned to adopt a pager-only mode wherein the mobile station cyclically transmits a first signal to the base station indicating that the mobile station is unable to receive messages from the base station. After transmitting the first signal, the mobile station is further conditioned to deactivate selected circuits within itself for a predetermined period of time and then to automatically reactivate the selected circuits after the predetermined time period has elapsed and to transmit a second signal to the base station indicating that the mobile station is able to receive messages.

In another embodiment, the first and second signals transmitted by the mobile station include power-down and power-up registration messages.

In yet another embodiment, the mobile station is adapted to allow the user to set and reset the pager-only mode.

A further embodiment of the invention comprises a cellular communications system having a mobile station conditioned to transmit a first signal to a base station to notify the base station when the mobile station is unable to receive messages. The mobile station includes a controller to deactivate selected circuits within the mobile station for a period of time and to automatically re-activate the selected circuits after the period of time has expired. The mobile station is further conditioned to transmit a second signal after the period of time has elapsed to notify the base station that the mobile station is ready to receive messages. The mobile station is conditioned to repeat this sequence of operations until it is set by the user into another mode. The controller is adapted to cause other selected circuits, not deactivated, to operated at reduced levels of power consupmption to further increase battery life. The predetermined period of time may be adjusted to even further increase battery life.

In accordance with the present invention, a method for saving battery power in a cellular radio communication system having a base station with a base station control signal, by transmitting a first signal from a mobile station to the base station indicating that the mobile station is unable to receive messages from the base station, deactivating selected circuits within the mobile station for a predetermined period of time, automatically reactivating said selected circuits within the mobile station after said predetermined time period, transmitting a second signal from the mobile station to the base station indicating that the mobile station is able to receive messages.

These and other features and advantages of the present invention will be readily apparent to one of ordinary skill in the art from the following written description when read in conjunction with the drawings in which like reference numerals refer to like elements.

DESCRIPTION OF THE INVENTION

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

System Operation

Figure 1:
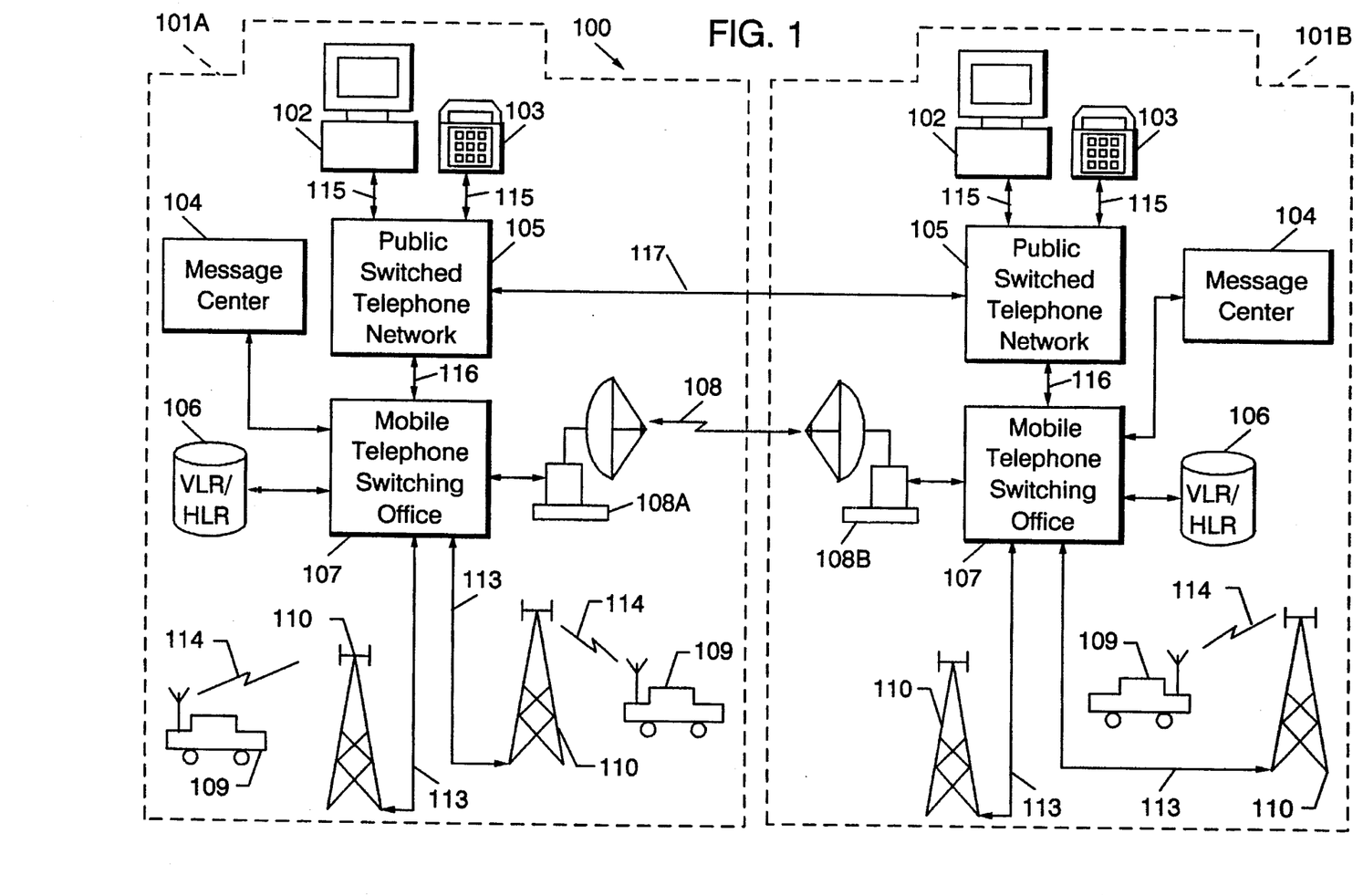
FIG. 1 is a schematic illustration of two interconnectable cellular systems.

Referring initially to FIG. 1, a typical cellular network 100 is illustrated showing the interconnection of two regional systems 101A and 101B. The system components shown are exemplary and as is obvious to one of ordinary skill in the art not all cellular systems will be limited to, or inclusive of, these components; other arrangements are possible as well. Regional system 101A comprises, for example, a mobile telephone switching office (MTSO) 107 connected to a plurality of base stations 110 each by communications link 113. Base station 110 provides the radio link 114 to each mobile station 109. Landline telephone user 103 and data users 102 are connected to the public telephone switched network (PSTN) 105 by communications link 115. The PSTN is, in turn, connected to the MTSO 107 by communications link 116. MTSO 107 is also connected to a visiting/home location register (VLR/HLR) 106 and to message center 104. Interconnection between networks 101A and 101B are effected between MTSOs 107 via an IS-41 communications link, in this case microwave link 108 using microwave antennas 108A and 108B, or alternately through the long-distance PSTN lines 117. As shown, communication connections may be established between landline telephone user 103 or data users 102 and mobile stations 109. When the complete connection occurs within the boundaries 101A or 101B mobile station 109 is said to be in its "home" system. If a connection occurs across systems 101A and 101B mobile station 109 is said to be "roaming." The terms "home system" and "roaming" are well-known to one of ordinary skill in the art.

As shown in FIG. 1 connections may occur between mobile stations 109 in the same system or mobile stations in different systems. Similarly, a communications connection may occur between a landline telephone user 103 or data user 102 and a mobile station 109. It may further be stated that mobile station 109 may be a cellular radiotelephone, a radio modem, or a personal digital assistant (PDA.)

Figure 2A:
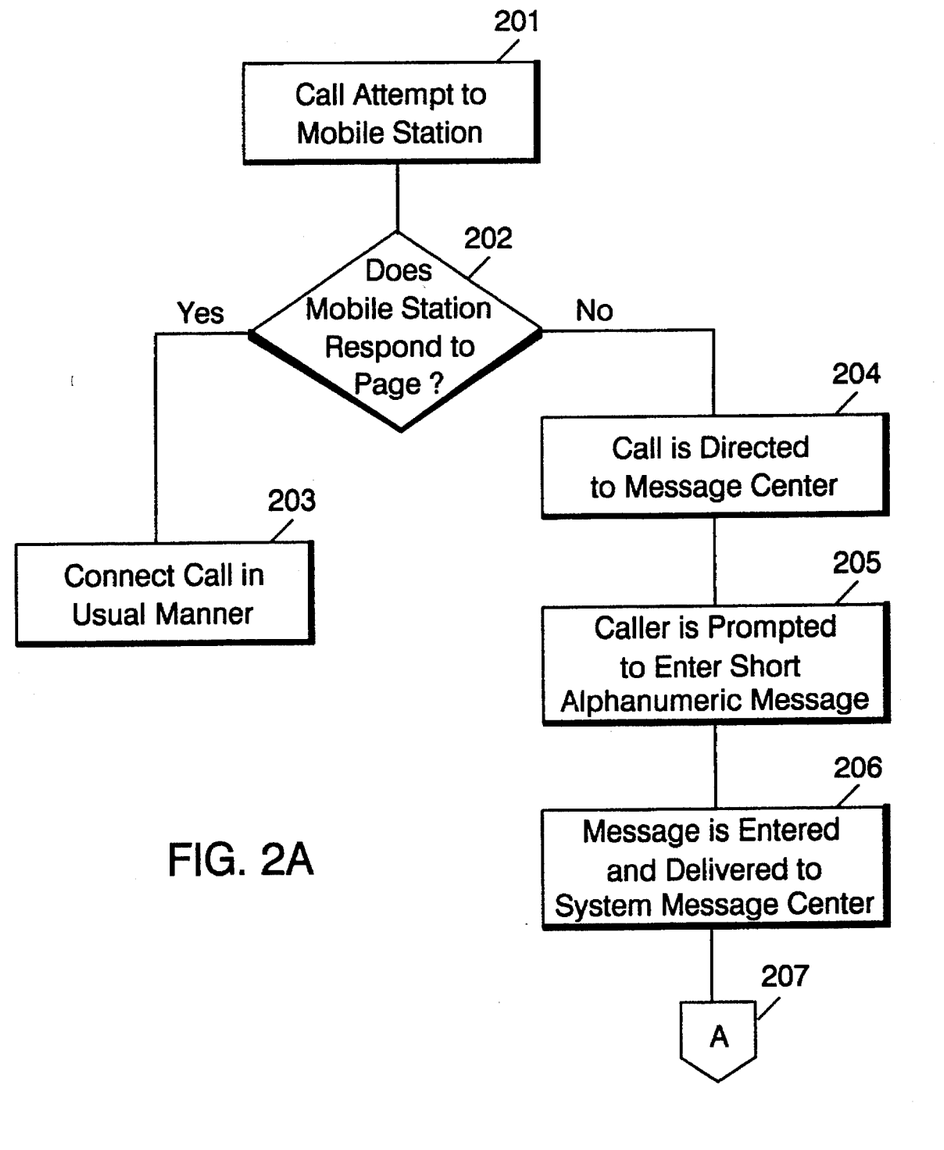
FIG. 2A is a flowchart illustrating how SMS messages are entered into the cellular system.

The typical operation of the SMS procedure is described by the flowchart of FIG. 2A. In one instance, for example, a landline telephone user, or caller, 103 attempts to place a call through the PSTN 105 and the MTSO 107 to mobile station 109 as indicated in block 201. If mobile station 109 answers (i.e., responds to the page broadcast from one of the base stations 110) then the connection is made according to known methods as indicated by block 203. Alternatively, if mobile station 109 does not answer then the caller 103 is routed through the MTSO 107 to the message center 104 as indicated in block 204.

There are several ways in which a message in block 206 may be received by the message center 104. The prompt in block 205 may, in one instance, be a human operator who answers the call and enters the message through a computer or console into message center 104. In another instance, the user 103 is prompted as indicated in block 205 to enter the message via the telephone keypad in a manner similar to the known procedures used to leave a message to be transmitted to a broadcast paging receiver. In yet another instance, the user may directly transfer the message from a personal digital assistant, or a personal computer 102. In this case the prompt in block 205 is a computer tone similar to a fax machine's set-up signaling. Regardless of the method used, a brief alphanumeric message is stored in message center 104 for later transmission to mobile station 109.

Figure 2B:
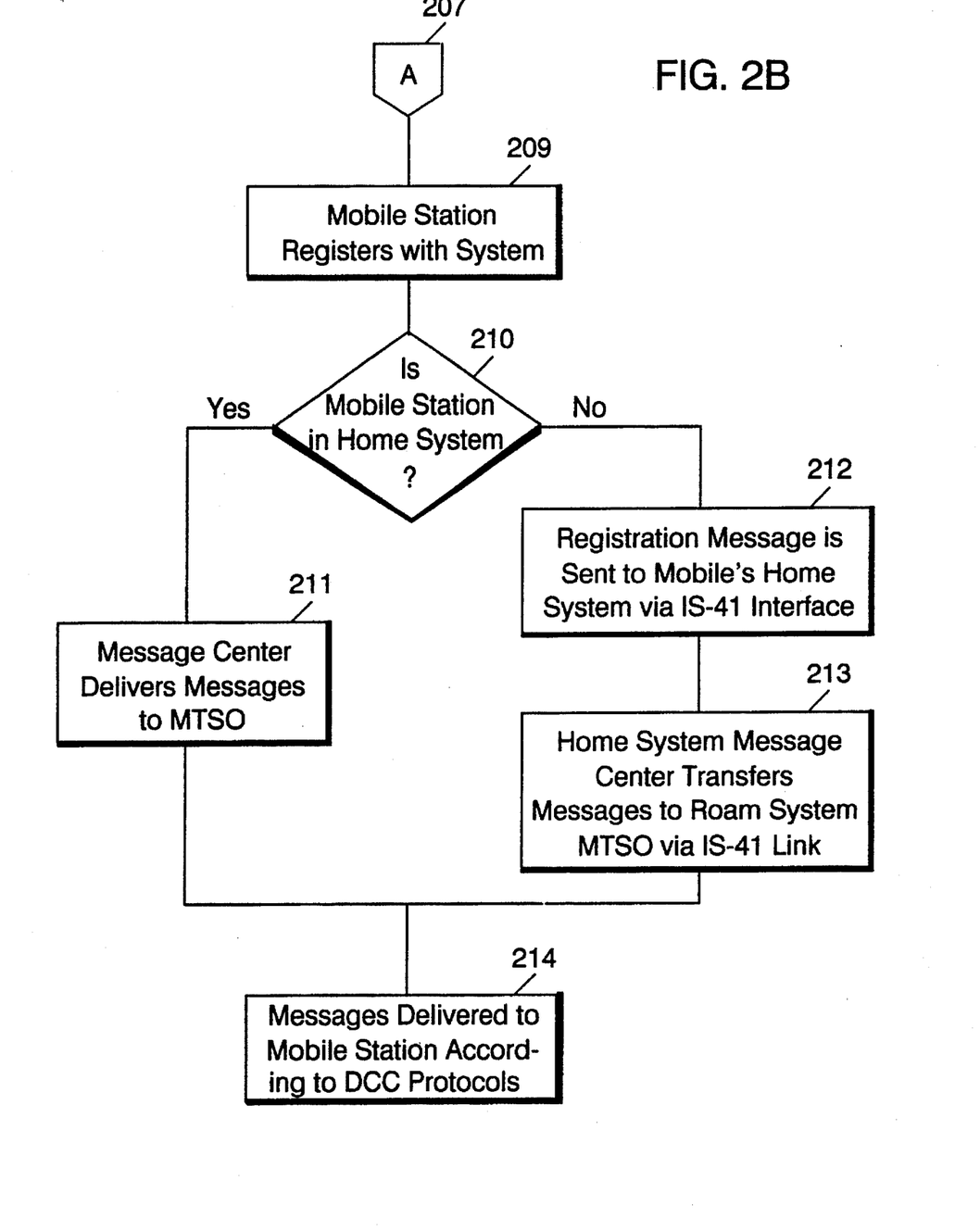
FIG. 2B is a flowchart illustrating how SMS messages are delivered a mobile station.

A description of how the stored message is forwarded to mobile station 109 is shown by the flowchart of FIG. 2B. When the mobile station is first powered-on, or otherwise wishes to make contact with the system as will be described in more detail hereinafter, mobile station 109 performs a registration with the system according to Section 6.3.7 of Specification PN 3011-1 as indicated in block 209. Based on information contained within mobile station's registration signal, system 101A, for example, determines if mobile station 109 is in its home system 101A or if it is roaming in system 101B as indicated in block 210. If the mobile station is in home system 101A, the SMS message stored in the message center 104 is broadcast as indicated in block 214 to mobile station 109 via the DCC protocols to be described. If, alternately, mobile station 109 is roaming in, for example, system 101B a registration message is sent to mobile station's 109 home system 101A via the IS-41 link 108 as indicated in block 212. Upon receipt of the registration message, the home system 101A message center 104 transfers the SMS message previously stored to roaming system 101B via the IS-41 link 108 as indicated in block 213. If no SMS messages are stored an indication thereof is alternately communicated. Once received, the SMS messages are broadcast via base station 110 to mobile station 109 according to the DCC specification.

Description of the DCC

A complete and thorough description of the DCC is provided in specifications PN 3011-1 and PN 3011-2 previously incorporated by reference. In the following, a summary description of the DCC is provided as necessary to make clear the operation of the present invention.

Figure 4A:
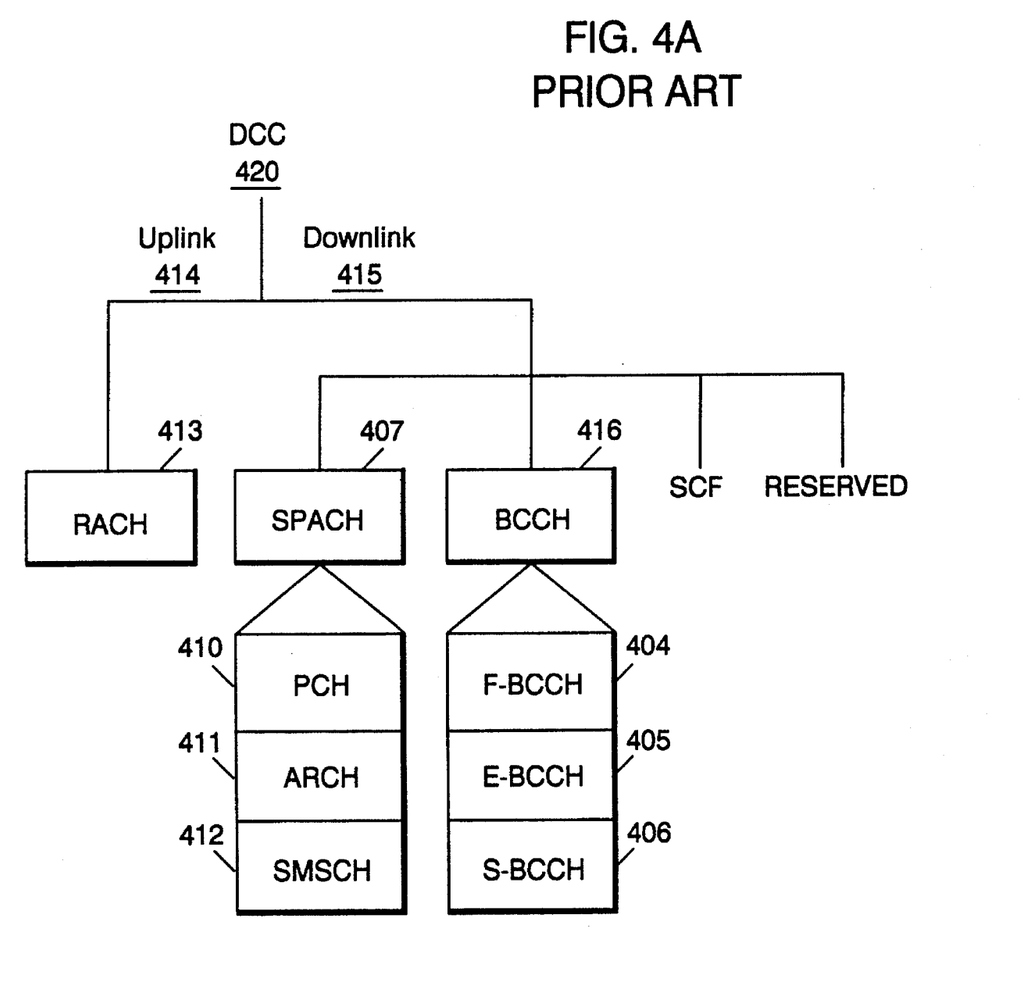
FIG. 4A is a schematic illustration of the uplink and downlink DCC.

The DCC 420 comprises the logical channels shown in FIG. 4A which is adapted from FIG. 2–3 of Specification 3011-1. Uplink channel 414 transmitted from mobile station 109 to base station 110 consists of the random access channel (RACH) 413. Downlink channel 415 transmitted from base station 110 to mobile station 109 consists of the broadcast control channel (BCCH) 416 and the short message, paging, and access control channel (SPACH) 407.

Figure 3:
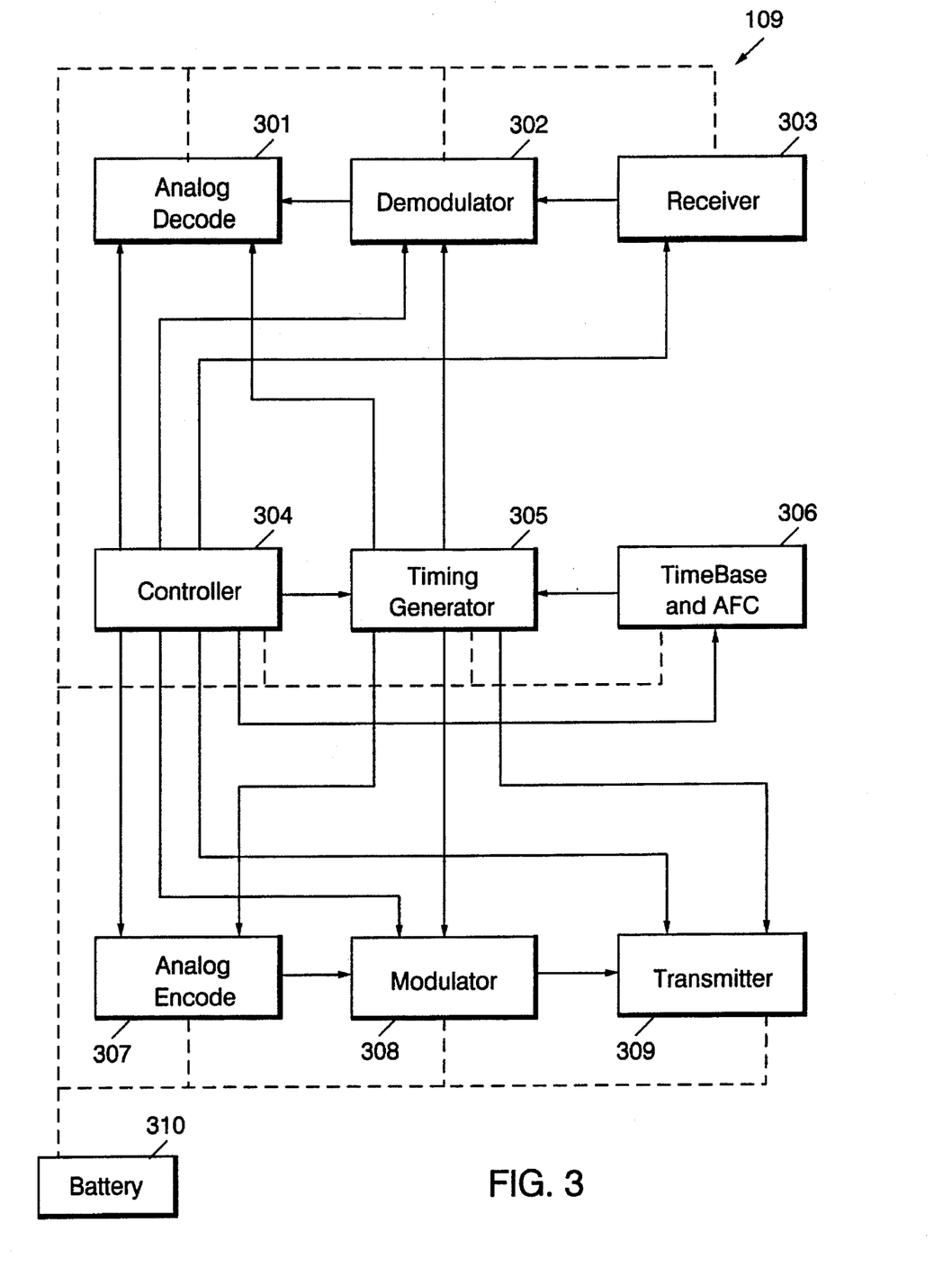
FIG. 3 is a partial schematic block diagram of a mobile station illustrating those elements relevant to the present invention.
Figure 4B:
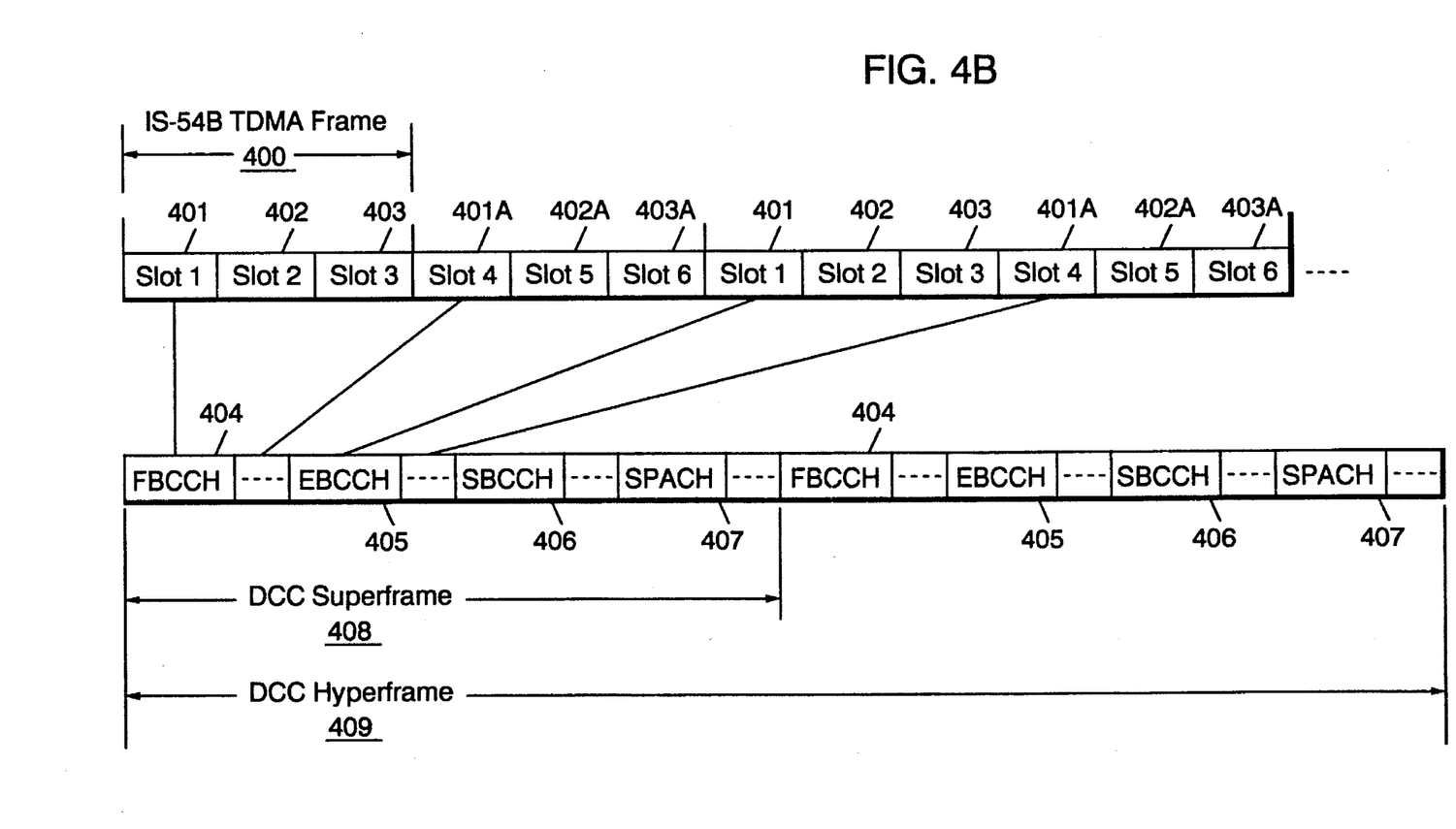
FIG. 4B is a schematic illustration of the downlink DCC frame structure.

In FIG. 4B is shown the frame structure of the Downlink DCC 415 as specified in specification PN 3011-1. To ensure compatibility with existing equipment, the DCC makes use of the present IS-54B TDMA frame structure. A TDMA frame 400 is defined as three contiguous time slots 401, 402, and 403. As specified in IS-54B, mobile station 109 will receive signals broadcast from base station 110 on every specified third slot, for example, mobile station 109 may continuously monitor slot 1 401 and slot 4 401A, slot 2 402 and slot 5 402A, or alternately slot 3 403 and slot 6 403A. Therefore during each TDMA frame 400 the mobile station receiver 303 (FIG. 3) to be described in more detail hereinafter need only be on ⅓ of the time.

A DCC superframe 408 is defined as a number of sequential TDMA frames 400. In the example shown in FIG. 4B, the DCC superframe 408 comprises information transmitted sequentially on every third slot of an IS-54B frame. Within the DCC superframe 408 are contained different information slots. The FBCCH 404, EBCCH, 405 and the SBBCH 406 are broadcast control channels which transmit global information for all mobile stations. FBCCH 404, EBCCH 405, and SBCCH 406 may extend over several slots as indicated by the dots in adjacent slots of the DCC superframe 408. The FBCCH 404, EBCCH 405, and the SBCCH 406 are described in more detail in Section 2.3.2 of PN 3011-1.

Slot 407 contains information directed at specific mobile stations 109 comprising the paging control channel (PCH) 410, access control channel (ARCH) 411, and the short message service control channel (SMSCH) 412.

Two DCC superframes 408 are arranged sequentially into a primary and secondary superframe which together are known as a hyperframe 409. SMS messages may be interleaved in the SPACH slot 407 across several hyperframes.

Mobile Station Operation

Normal monitoring of the DCC downlink 415 by mobile station 109 involves checking, for example, each SPACH slot 407 on the DCC superframe 408 as shown in FIG. 4B. In order to monitor each slot, the mobile station executes the sequence of operations shown by the flowchart of FIG. 5. Mobile station 109 first "powers-up" as indicated in block 501. Powering up may be effected by the user turning mobile station 109 on from being completely off, or it may be waking up from what is refered to as a "deep sleep state" as will be described in more detail hereinafter. After powering up, mobile station 109 scans, according to known methods, a predetermined set of DCC downlink channels 415 and locks its receiver to one of the DCCs 415 as indicated in block 502. Once locked to a DCC 415, mobile station 109 receives and decodes DCC hyperframe 409 as indicated in block 503. In the FBCCH slot 404 is contained information identifying the SPACH paging slot and the paging class mark, to be described in more detail hereinafter, to be used by mobile station 109. As indicated by block 504, mobile station 109 transmits via RACH 414 a "power-up" registration to the base station 110 and receives via the downlink DCC 415 an acknowledgment back from base station 110. The acknowledgment may contain additional information instructing mobile station 109 to monitor another DCC 420 or to otherwise override the FBCCH information. Assuming that an acknowledgment and no instructions are received from base station 110, mobile station 109 assumes in block 505 the paging class corresponding to the paging class mark in FBCCH slot 404 received in block 503. Paging class marks are described in greater detail in section 4.5.5 of specification PN 3011-1.

Figure 5:
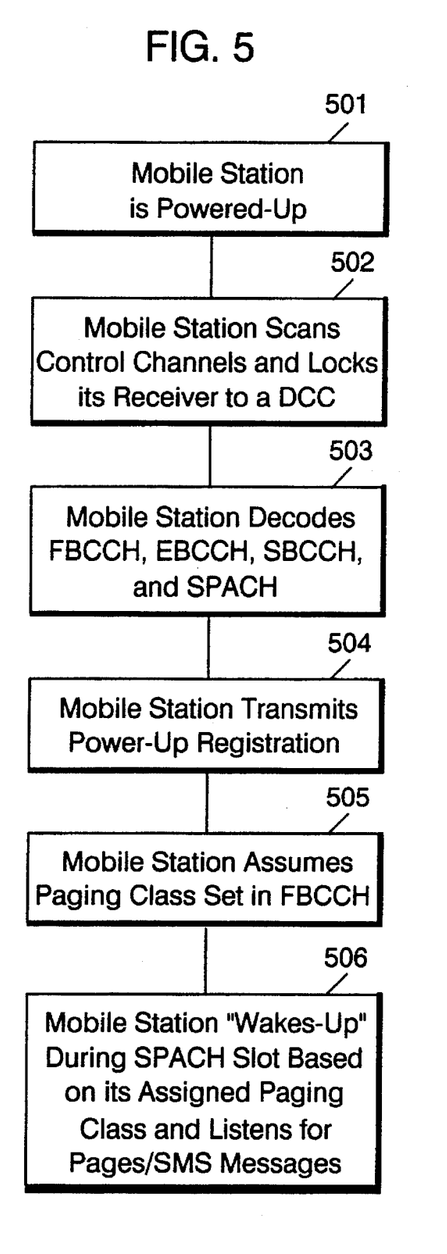
FIG. 5 is a flowchart illustrating the method used by the mobile station to monitor the DCC.

There are 8 paging classes designated 1–8 which specify the frequency with which mobile station 109 listens to SPACH slot 407 for a SMS message as indicated in block 506. A first mobile station 109 assigned to paging class 1 monitors one SPACH slot 407 for each hyperframe 409, a second mobile station 109 assigned to paging class 2 monitors one SPACH slot 407 for every other hyperframe 409, a third mobile station 109 assigned to paging class 3 monitors one SPACH slot 407 for every third hyperframe 409, and so on. In paging class 8, for example, mobile station 109 may only monitor a SPACH slot 407 every 2 minutes for SMS messages. This procedure allows the system operator to assign so called sleep-modes. This procedure is known and described in greater detail in specifications PN 3011-1 and PN 3011-2.

Referring now to FIG. 3, a partial functional block diagram of a mobile station 109 is shown. During SPACH slot 407, power must be applied to receiver 303, demodulator 302, controller 304, timing generator 305, and the timebase/automatic frequency control (AFC) 306. The timebase 306 may be a temperature controlled crystal oscillator (TCXO). In between SPACH slots 407 however, all that is required to be activated is timing generator 305 and the timebase/AFC 306 to keep track of when the next SPACH slot 407 is to occur. However, if the next SPACH slot 407 is to be decoded correctly, as is obvious to one of ordinary skill in the art, the timing accuracy must be accurate to within a couple of symbol periods. This requires timing generator 305 and the timebase/AFC 306 to operate in a precise manner wherein power must also be applied to the controller 304 to control operation of timing generator 305 and AFC 306. During the intervals between SPACH slots 407 timing generator 305 and controller 304 may operate at a greatly reduced instruction rate and therefore have reduced current requirements. However, in order to maintain the timing accuracy required the timebase/AFC 306 must remain fully active between SPACH slots 407. The necessity of maintaining the timebase/AFC 306 fully active places a lower limit on the amount of current drawn from battery 310 and hence limits the absolute battery life.

Operation of the Page Only Mode

When a user of mobile station 109 wishes to place calls but not to receive incoming calls the user may simply turn the phone off until such time as the user decides to place a call. By so doing the user may maximize the life of battery 310 since little or no current is drawn by the circuits shown in FIG. 3 when mobile station 109 is deactivated. However, if the mobile station 109 is deactivated mobile station 109 is not able to receive incoming SMS messages.

Figure 6A:
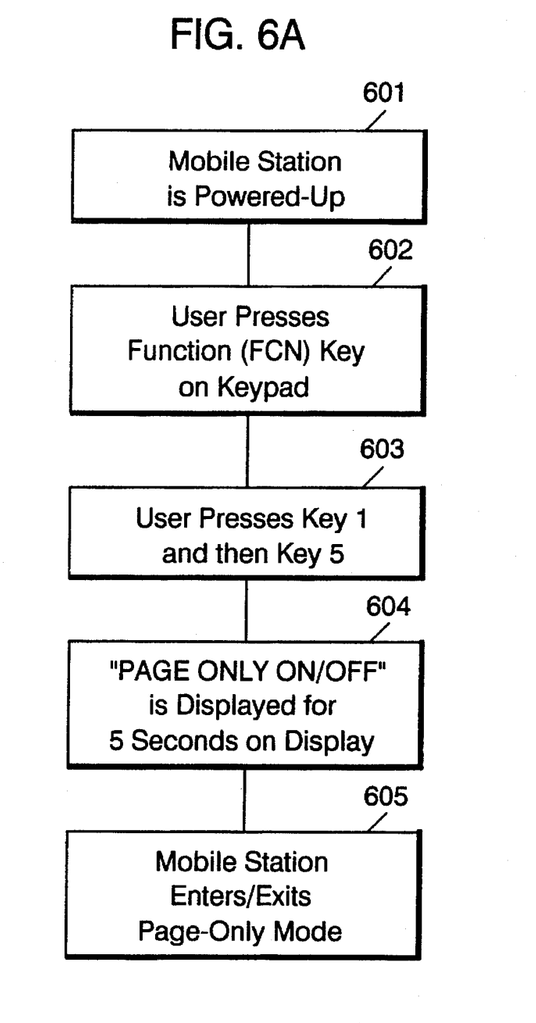
FIG. 6A is a flowchart illustrating the method used to place the mobile station into a pager-only mode.
Figure 6B:
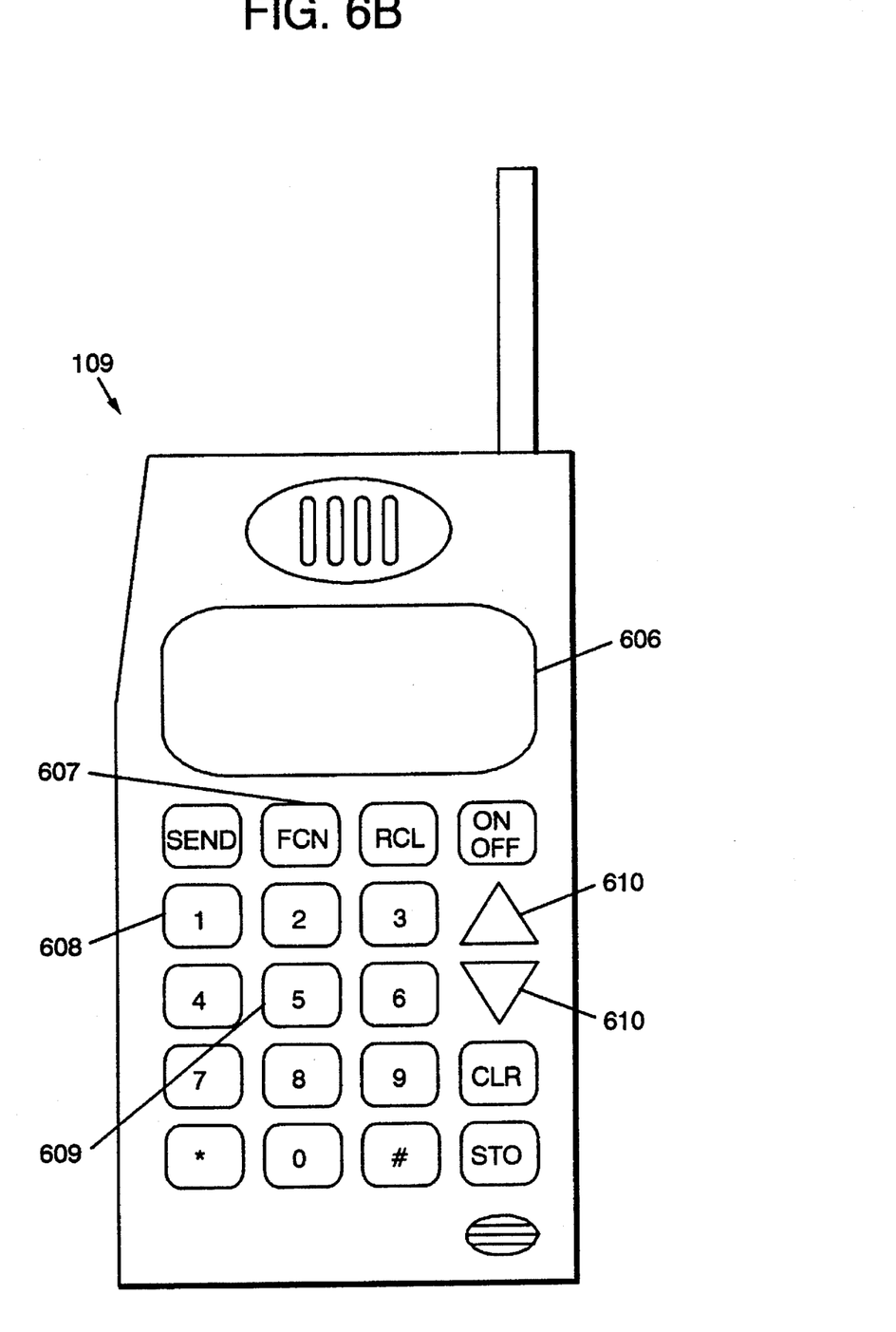
FIG. 6B is an illustration of an exemplary cellular radiotelephone showing the keys required to place the mobile station into the pager-only mode.

If, alternately, the user of mobile station 109 wishes to place calls and to also receive SMS messages while at the same time maximizing battery life, the user of mobile station 109 may select to place the phone into what is refered to as the "pager-only mode." One method by which the user may place mobile station 109 into a pager-only mode is described in FIG. 6A. It will be understood by those of ordinary skill in the art that there are many ways for the user to establish/ select a pager-only function in a cellular telephone. The example given in FIGS. 6A and 6B are therefore exemplary only and are not meant to be limitative. First, as indicated in block 601, the mobile station 109 is be turned on in the normal manner. Then as shown in FIG. 6B, the user then sequentially presses function key 607, the '1' key 608, and finally the '5' key 609 on the keypad of mobile station 109 as indicated in blocks 602–603. Executing this sequence will toggle the mobile station into the pager-only mode. Repeating the sequence will reset the mobile station into the normal stand-by mode where mobile station 109 monitors the DCC according to its assigned paging class. Another method for placing mobile station 109 into a pager-only mode requires the user to enter a menu mode and, using the arrow keys 610 commonly found on mobile stations, the user can sequence through the available options to select or deselect the pager-only mode. To confirm that mobile station 109 is in the pager-only mode a brief indication will be shown on display 606 of the mobile station 109 as indicated in block 604. After a brief period, display 606 will go blank until such time as a SMS message is received.

Figure 7:
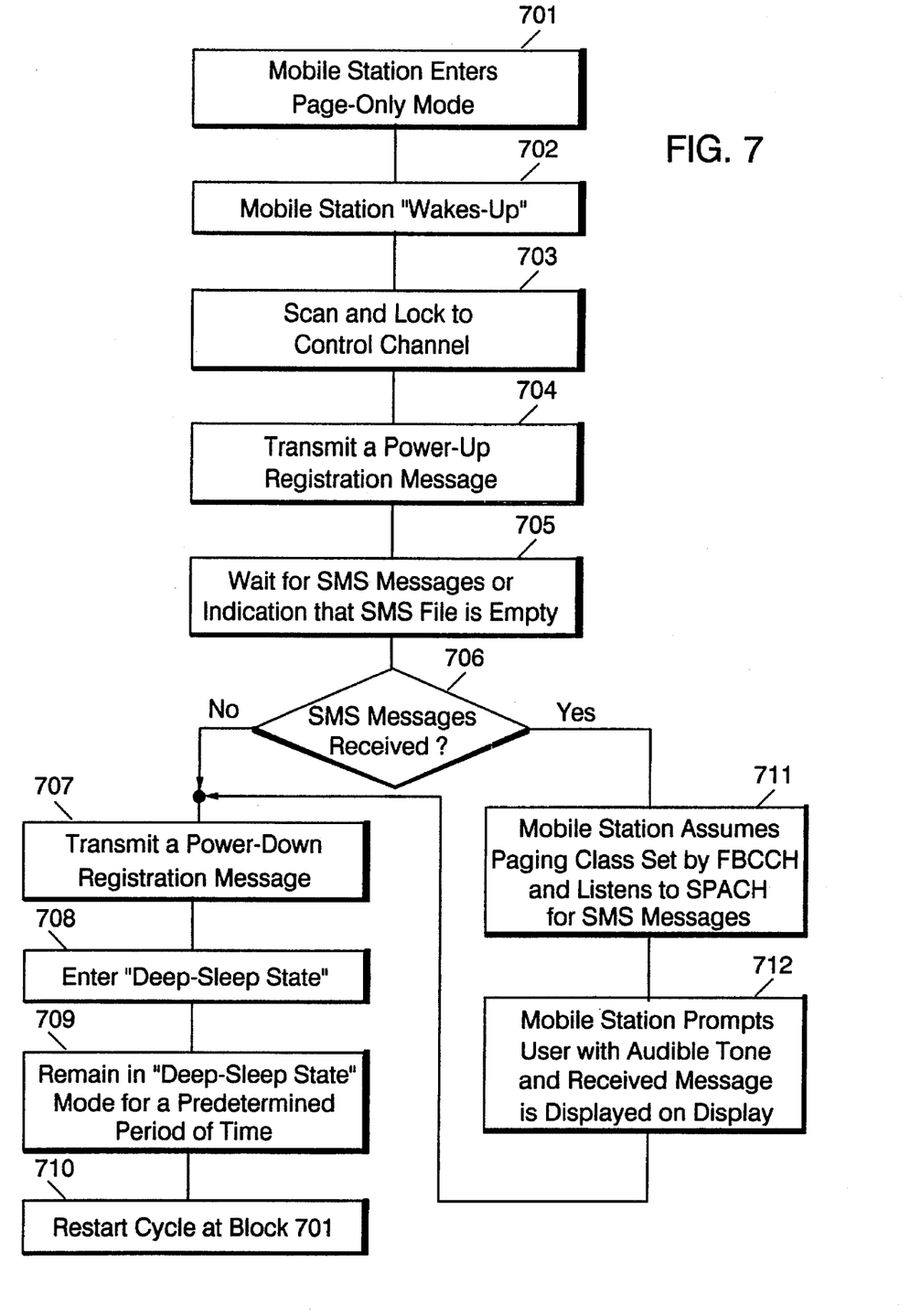
FIG. 7 is a flowchart illustrating the operation of the mobile station operating in a pager-only mode.

Referring now to FIG. 7, the operation of mobile station 109 in the pager-only mode is described. Once mobile station 109 has entered the pager-only mode as indicated in block 701 all circuits non-essential to the operation of the mobile station 109 while in the pager-only mode are de-activated as will be described. This is refered to as the "deep-sleep" state. Referring back to FIG. 3, in the deep sleep state analog decode 301, demodulator 302, receiver 303, analog encode 307, modulator 308, and transmitter 309, are deactivated. Time base/AFC 306 is kept running, but at a significantly reduced level since its accuracy can be allowed to drift substantially. Timing generator 305 must also be kept activated but at an extremely low level of activity only sufficient to count the number of oscillations generated by the timebase/AFC 306. In this state, the current requirements of mobile station 109 are extremely low and hence the current drain from the battery 310 is greatly reduced.

After a predetermined period of time (e.g., 10 minutes), or equivalently a predetermined number of oscillations, timing generator 305 alerts controller 304 to "wake-up" and reactivate the receiver 303, the demodulator 302, and to increase the activity and hence the accuracy of the timebase/AFC 306. It is obvious to one of ordinary skill in the art that the predetermined period of time may be adjusted either by the user or at the time of manufacture. Controller 304 and the timing generator 305 also increase their activity level sufficient to perform the functions necessary to monitor the DCC 415. This sequence of operations is termed "waking-up" as indicated in block 702. Again similar to FIG. 5, the mobile station begins to scan the DCC 415 and locks its receiver 303 to one of the DCC superframes 408 as indicated in block 703. As indicated in block 704, mobile station 109 transmits via the RACH 413 a power-up registration message to base station 110 to alert, via MTSO 107, message center 104 that mobile station 109 is active and prepared to receive SMS messages. Mobile station 109 begins to monitor the SPACH slot, pursuant to it's paging class as previously described, for SMS messages as indicated in block 705. If, as shown in block 706, it is indicated via the SPACH 407 that there are no SMS messages waiting to be transmitted from base station 110 and received by mobile station 109, mobile station 109 transmits via the RACH 413 a power off, or power-down, registration as indicated in block 707. Power-up, or power-on, and power-off, or power-down registration messages are transmitted from mobile station 109 to base station 110 over the uplink DCC 414, or RACH 413, as described in greater detail in specification PN 3011-1. The message format is identical except for the bit field which indicates whether the registration message is a power-up, or power-down registration. Once the transmission is complete, the mobile station 109 automatically re-enters the deep-sleep state and de-activates all non-essential circuits as previously described and indicated in block 708. Mobile station 109 remains in the deep-sleep state until again a predetermined time period has elapsed (i.e., 10 minutes) at which time the cycle is repeated. This continues until the user resets the pager-only mode as described above.

If, alternatively, at block 706 the mobile station receives an SMS message from base station 110, it assumes the paging class set by the FBCCH 404 and continuously monitors the DCC 415 until the complete SMS message is received as indicated in block 711. The SMS message is transmitted from base station 110 to mobile station 109 over sequential occurrences of the SPACH 407 according to known DCC protocols. As the message is received it is stored electronically within mobile station 109 for subsequent retrieval by the user. In block 712 mobile station 109 alerts the user via a visual, audible, or mechanical (e.g. vibration) that a SMS message has been received. At this point the user may elect to read the SMS message. After issuing the alert, and regardless of whether or not the user has reviewed the messages, the mobile station re-enters the sleep-mode via block 707 as previously described.

Figure 8:
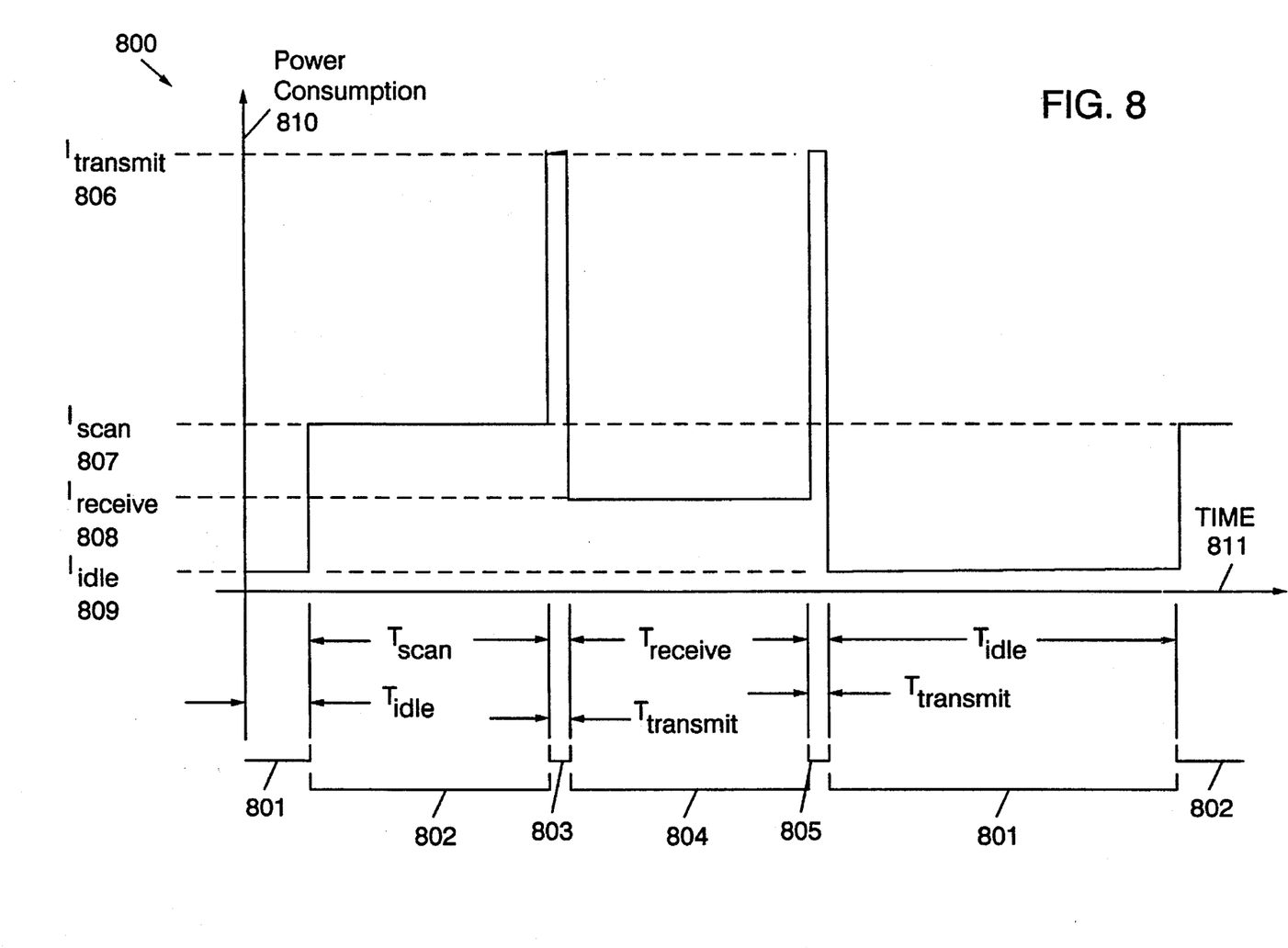
FIG. 8 is a timing diagram illustrating the operation of the mobile station operating in a pager-only mode.

In FIG. 8 is shown the power savings advantage afforded by the present invention. Note that power savings refers equivalently to the reduction of electrical current drawn from battery 310. Referring to FIG. 8 the relative current consumption of the mobile station 109, a measure of power consumption and hence relative battery life, is displayed on the ordinate axis 810. Time is displayed on the abscissa 811. Read in conjunction with the flowchart of FIG. 7 the significance of the graph of FIG. 8 will be described. After "waking-up" in block 702, mobile station 109 begins to scan control channels as indicated in section 802 of the graph. During channel scan, a moderate amount of current is required as indicated by $I_{scan}$ 807 on the ordinate. Once the receiver 303 locks on to a control channel 415 as indicated in block 703, the mobile station 109 transmits a power-up registration as indicated in block 704. During the transmission phase 803 mobile station 109 draws the greatest amount of current from battery 310 as indicated by $I_{transmit}$ 806. After transmitting the power-up registration, mobile station 109 periodically scans in section 804 the SPACH 407 to see if any SMS messages as indicated in block 705 are present. Due to the periodic monitoring of the SPACH 407 the current requirements $I_{receive}$ 808 are lower than when the receiver 303 continuously scans the control channels as in section 802. After reception of, if any, the SMS messages mobile station 109 transmits a power-down registration as in block 707. Again since mobile station 109 is transmitting in section 805, the power requirements $I_{transmit}$ 806 are high. After transmitting the power-off registration, the mobile station enters its deep-sleep state as in block 708. During this interval 801 only the minimal essential circuits are energized and power and current consumption $I_{idle}$ 809 is greatly reduced. Mobile station 109 remains in this state for a predetermined duration $T_{idle}$ and then the process repeats at block 702. For this cyclical operation, the average current consumption can be calculated as follows:

$$I_{average} = \left[ \frac{(I_{scan} * T_{scan}) + 2(I_{transmit} * T_{transmit}) + (I_{receive} * T_{receive}) + (I_{idle} * T_{idle})}{(T_{scan} + 2T_{transmit} + T_{receive} + T_{idle})} \right] \quad \text{Equation 1}$$

Using Equation 1, the average current drawn from battery 310, $I_{average}$, of the present invention can be compared to the average current drawn from battery 310 while continuously monitoring the DCC 415 as is done presently. For typical mobile stations, the average current drawn from battery 310 while continuously monitoring the DCC 415 has been found to be approximately 15 milliamperes. With a 500 milliampere-hour battery this gives a stand-by time of approximately 33 hours.

Typical values for the variables in equation 1 are given below in Table 1:

TABLE 1

| Operation | Current Variable | Power Consumption (milliamperes) | Time Variable | Time (seconds) |
|---|---|---|---|---|
| Transmit | $I_{transmit}$ | 600 | $T_{transmit}$ | 100 ms |
| DCC Scan | $I_{scan}$ | 200 | $T_{scan}$ | 2 s |
| Receive SMS | $I_{receive}$ | 15 | $T_{receive}$ | 5 s |
| Sleep | $I_{sleep}$ | 3 | $T_{sleep}$ | 600 s |

Applying these values to Equation 1 yields an average current, $I_{average}$, of 3.95 milliamperes. Therefore a mobile station incorporating the present invention equipped with the same 500 milliampere-hour battery provides a battery life of approximately 128 hours. This is a significant improvement over the prior-art and represents a distinct advantage to the user of a digital radiotelephone who wishes to make, but at times not to receive, calls and to utilize the SMS feature available under the DCC 415. As is obvious to one of ordinary skill in the art, significantly longer battery lives will be available by increasing the idle time above the 10 minutes used in the above example.

The user enjoys the benefit of longer battery life until such time as the user takes affirmative action to exit the pager-only mode, for example, by repeating the steps shown in FIG. 6A. Of course, a phone call may be made at any time during which the pager-only mode is temporarily suspended for the length of the call.

While the present invention has been described with respect to a particular digital cellular communications system, those skilled in the art will recognize that the present invention is also applicable to other communications systems and that therefore the present invention is not limited to the specific embodiments described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. In a cellular radio communication system including a base station with a base station control signal, said control signal having a plurality of paging classes numbered 1 through N, said paging classes corresponding to lengths of time between paging time slots during which paging information is broadcast, and at least one mobile station conditioned to receive paging information broadcast by the base station during said paging time slots corresponding to a particular paging class assigned to the mobile station by the base station, said mobile station further having a regular sleep mode wherein a first set of selected circuits are deactivated and a deep sleep mode wherein a second set of selected circuits are deactivated, a method for saving battery power in the mobile station, comprising the steps of:

(a) placing the mobile station into a page only mode;

(b) transmitting a first signal from the mobile station to the base station indicating that the mobile station is unable to receive messages from the base station;

(c) entering said deep-sleep mode by deactivating said first set and said second set of selected circuits within the mobile station for a predetermined period of time;

(d) automatically entering said regular sleep mode by reactivating said second set of selected circuits within the mobile station after said predetermined time period;

(e) reactivating said first set of selected circuits and receiving by the mobile station the base station control signal and transmitting from the mobile station a second signal indicating that the mobile station is able to receive said messages;

(f) transmitting from the base station said messages on a set of said plurality of time slots of the base station control signal;

(g) monitoring by the mobile station said messages on said set of said plurality of time slots of the base station control signal; and (h) repeating steps (b) through (g) until said mobile station is reset from said page only mode.

2. The method of claim 1, wherein said predetermined period of time is longer than the longest paging class.

3. The method of claim 1, wherein said second set of selected circuits includes a temperature controlled crystal oscillator.

4. The method of claim 1, wherein said deep sleep mode reduces the average current drain from as compared to the regular sleep mode.

5. The method of claim 1, wherein said predetermined period of time is determined by the mobile station.

6. The method of claim 1, wherein said first signal includes a power-down registration message.

7. The method of claim 1, wherein said second signal includes a power-up registration message.

* * * * *